United States Patent [19]

DiMassimo et al.

[11] 4,342,922
[45] Aug. 3, 1982

[54] AC FAIL-DETECT AND BATTERY SWITCHOVER CIRCUIT FOR MULTI-BUS POWER SUPPLY

[75] Inventors: Donald V. DiMassimo; John B. May, both of Liverpool, N.Y.

[73] Assignee: General Electric Company, Schenectady, N.Y.

[21] Appl. No.: 231,697

[22] Filed: Feb. 5, 1981

[51] Int. Cl.³ .............................................. H02J 9/06
[52] U.S. Cl. ...................................... 307/66; 307/130
[58] Field of Search ...................... 307/66, 85, 86, 130, 307/126, 46, 48, 49, 50

[56] References Cited

U.S. PATENT DOCUMENTS 4,225,792 9/1980 Fahey ...................................... 307/66
4,234,920 11/1980 Van Ness et al. .................. 364/200

Primary Examiner—Michael L. Gellner
Assistant Examiner—James L. Dwyer
Attorney, Agent, or Firm—Alexander M. Gerasimow; James C. Davis, Jr.; Marvin Snyder

[57] ABSTRACT

A power supply having reliable means to detect the failure of an AC power source and to provide an AC fail signal in response thereto includes error-free switchover circuitry to supply emergency power from a standby battery. The power supply comprises a comparator circuit, a Schmitt trigger-inverter circuit, and a feedback circuit which provides positive regeneration to ensure error-free battery switching under AC power fail or restore conditions.

8 Claims, 9 Drawing Figures

AC FAIL-DETECT AND BATTERY SWITCHOVER CIRCUIT FOR MULTI-BUS POWER SUPPLY

BACKGROUND OF THE INVENTION

This invention relates to electronic power supplies equipped with means to detect an AC power failure and which include circuitry to provide error-free switchover to a standby battery power source.

In microprocessor based electronic systems, as in other electronic circuits in which the main source of power is the AC power mains, a need often arises to provide emergency power for critical circuitry that must remain operational and/or store data when the AC power fails. This problem is particularly severe in some microprocessor systems, since the battery must provide power to time-keeping circuitry and preserve full memory storage for some minimum period of time which may be as long as a month or longer. Moreover, the battery must retain sufficient power reserve even after several years of storage in remotely installed, unattended systems. Therefore, if the battery is a primary cell (i.e., non-rechargeable) no drain current or battery external leakage should occur during the standby period.

It is also important that the power supply have circuitry to detect an AC power failure and to switch over to the battery with only negligible switching transients. Upon restoration of the AC power, switchover from the battery to the AC power supply must also occur in a transient-free manner. The AC fail signal should provide an unambiguous, error-free indication that an AC failure has occurred. The AC fail signal voltage must be maintained for a certain minimum interval. This permits the microprocessor, for example, to identify the signal as indicating an AC power failure and to initiate a power-down mode routine which turns off high power consuming circuitry. The microprocessor may also reduce the system clock frequency to further reduce standby battery power consumption.

The present invention provides an AC fail-detect circuit and battery switchover circuitry in accordance with the aforedescribed features.

SUMMARY OF THE INVENTION

The multi-bus power supply of the present invention includes an AC fail-detect circuit as well as other circuitry for providing an AC fail signal and for switching critical circuitry to a standby battery upon the detection of the AC power failure. The AC fail-detect circuit comprises a comparator circuit which compares a filtered, but unregulated, DC voltage provided by a full-wave AC rectifier circuit with a reference voltage provided by the standby battery. As the DC voltage drops below the reference voltage by more than a predetermined amount, the collector voltage of a transistor, which forms part of the comparator circuit, decreases. When the collector voltage drops below the trip voltage of a Schmitt trigger-inverter circuit, an AC fail signal is produced. The time constant associated with a resistor-capacitor (RC) feedback network connected between the output of the Schmitt trigger-inverter and the base of the transistor ensures that the AC fail signal is maintained for sufficient length of time to be detected and recognized by, for example, the microprocessor system. The AC fail signal also biases into conduction a second transistor which connects the standby battery to the critical load bus.

Accordingly, it is an object of the present invention to provide a multi-bus power supply with AC fail-detect means and switchover circuit to supply emergency power from a standby battery when the AC power fails.

Another object of the invention is to provide an AC fail-detect circuit which provides a unambiguous signal indication that an AC failure has occurred and which maintains the signal for no less than a predetermined period of time.

Still another object of the invention is to provide a battery switchover circuit in which the switchover occurs in a transient-free manner.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 1:
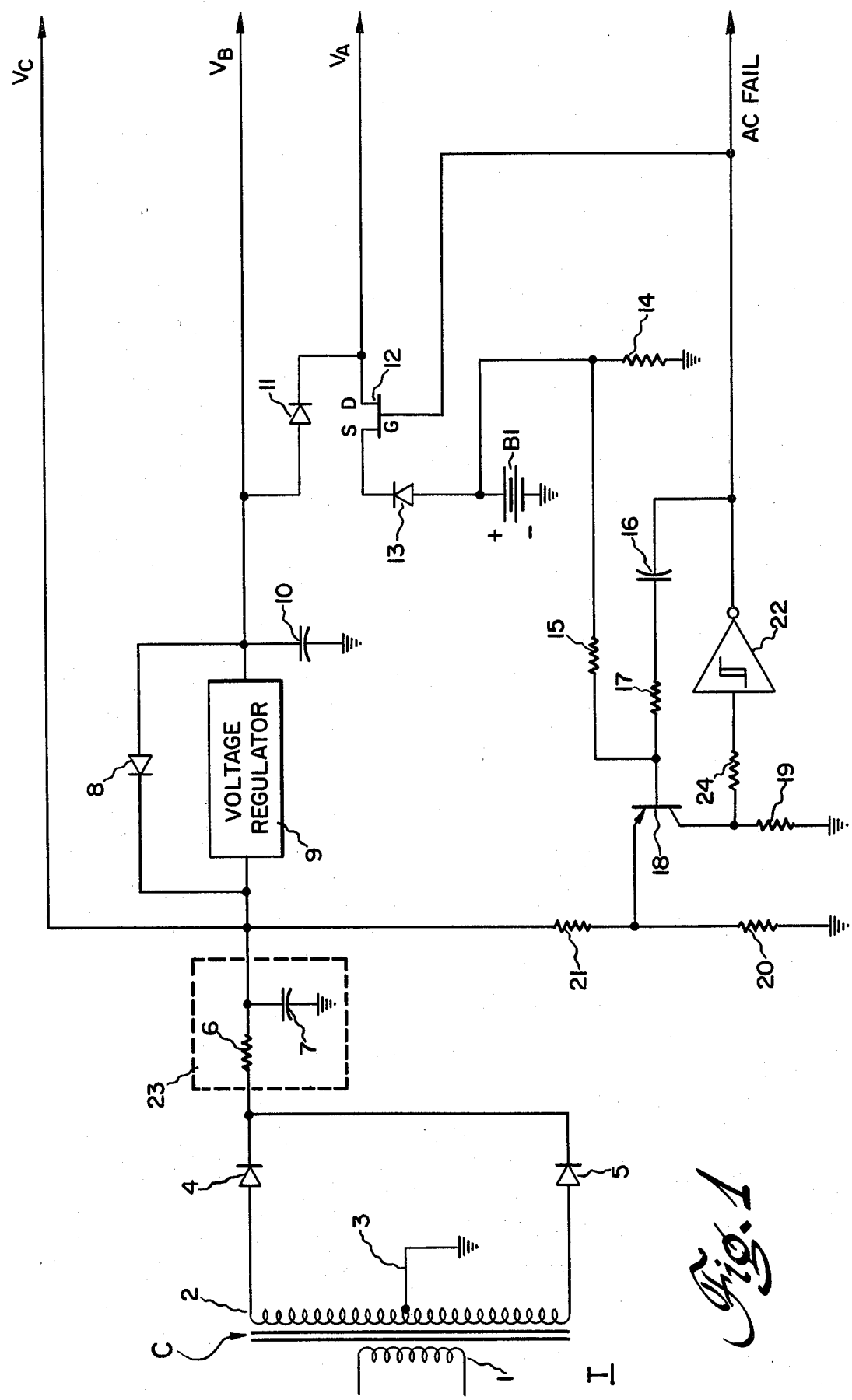
FIG. 1 is a schematic diagram of the power supply and associated circuitry in accordance with the present invention.

FIG. 1 illustrates schematically the multi-bus power supply circuit along with the AC fail-detect and standby battery switchover circuitry. The power supply comprises a full-wave rectifier made up of a transformer T with a core C having wound thereon a primary winding 1 connected to a commercial AC power supply (not shown) and a secondary winding 2 including a grounded center tap 3. The respective anodes of a pair of rectifier diodes 4 and 5 are connected to each end of the secondary winding 2, while the respective cathodes thereof are connected to one end of a resistor 6 which forms part of a filter circuit generally designated 23 in FIG. 1. The filtered output voltage appears on a voltage bus $V_C$ across a filter capacitor 7 connected on one side to the free end of resistor 6 and on the other side to ground. The voltage on supply bus $V_C$ may be employed to power circuit loads which do not require a regulated voltage source.

For loads requiring a regulated voltage, the voltage on bus $V_C$ is supplied to a conventional voltage regulator 9 which provides a regulated voltage output across a second filter capacitor 10, connected between the output of regulator 9 and ground, to voltage bus $V_B$ and through a diode 11 to voltage bus $V_A$. Capacitor 10 may also supply additional transient power to loads (not shown) on buses $V_B$ or $V_A$ when the demand exceeds the level which the regulator can readily provide. A protection diode 8 is coupled at its anode to the output of regulator 9 and at its cathode to the input of regulator 9, and prevents regulator 9 from being damaged if its input voltage were to drop to zero (as it does when the AC power fails) and the voltage on capacitor 10, and on other load circuit capacitances (not shown), were to drive the regulator in the reverse direction.

The voltage regulator 9 may comprise any suitable device which is rated to provide the desired output voltage and current on buses $V_B$ and $V_A$. In the preferred embodiment, the regulator comprises a device identified by the designation MA78M06M (available from Motorola) and which produces a regulated output voltage of approximately 6 volts.

The AC fail-detect function is performed by a PNP transistor 18 which operates as a comparator. At its base transistor 18 is coupled through resistor 15 to the anode of a battery B1 which has its cathode grounded and which serves a dual function of reference voltage and standby battery. The anode of the battery is also grounded through resistor 14. A second reference voltage is supplied to the emitter of transistor 18 by a voltage divider made up of series connected resistors 21 and 20. The free end of resistor 21 is connected to bus $V_C$, while the free end of resistor 20 is grounded. The values of resistors 21 and 20 are selected so that the voltage at the emitter, which is connected to the common point of resistors 21 and 20, is approximately two-thirds of the voltage at the output of the filter circuit 23. The exact relationship of the emitter voltage to the filter output voltage is not critical, although it must be sufficiently greater than the reference voltage provided by battery B1 to the base of transistor 18 to prevent the maximum and minimum ripple levels, which may be associated with the voltage on the $V_C$ bus, from intermittently biasing transistor 18 into or out of conduction.

The output of comparator transistor 18, which appears across a resistor 19 connected between the collector and ground, is coupled to the input of a conventional Schmitt trigger-inverter circuit 22 through an input resistor 24. In the preferred embodiment, the Schmitt trigger-inverter 22 comprises a Radio Corporation of America integrated circuit device identified by the designation CD40106B.

The output of the Schmitt-trigger inverter circuit 22 is coupled to the base of transistor 18 by a regenerative feedback network comprising a series-connected capacitor 16 and resistor 17. The network ensures that transistor 18 is reliably biased into a non-conductive or conductive state for at least a short but definite period of time, depending on whether the AC power has failed or has been restored, respectively. This ensures that any on/off transitions in the output of Schmitt trigger-inverter circuit 22 due to transistor 18 being biased into conduction or nonconduction by voltage transients or voltage ripple at its emitter will also be present for at least the time constant periods determined by resistors 17 and 15 and capacitor 16. In this manner, it is possible to avoid erratic responses by, for example, a microprocessor system connected to the output of the Schmitt trigger-inverter circuit 22. The system responds only to an AC fail signal of at least a minimum predetermined duration, rather than to narrow pulses due to transients or other noise which may occur at the emitter of transistor 18.

The output of the Schmitt trigger-inverter circuit 22 is supplied to the gate of an FET transistor 12. Transistor 12 is ordinarily nonconductive. However, when the AC fail signal is applied to the gate, the transistor is biased into conduction and, through diode 13 connected between its source and the anode of battery B1, provides at its drain connected to bus $V_A$ emergency power from the battery.

Figure 2A:
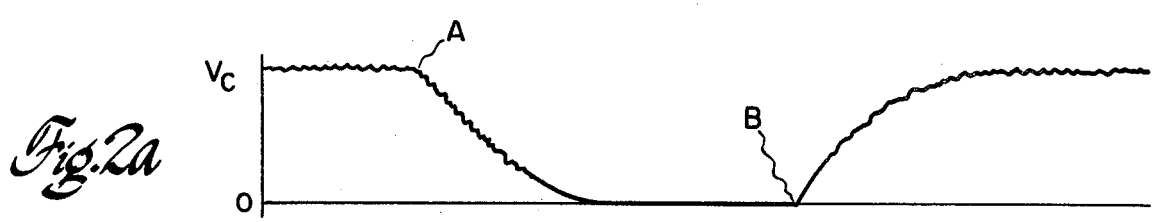
FIGS. 2a–2h illustrate diagrammatically various circuit voltage waveforms which, when considered with the schematic diagram of FIG. 1 are helpful in understanding the principles of operation of the inventive power supply.
Figure 2B:
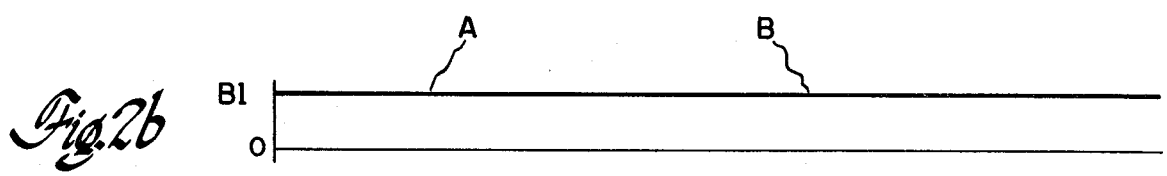
Figure 2C:
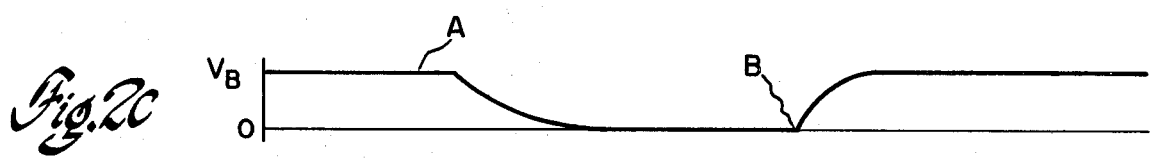
Figure 2D:
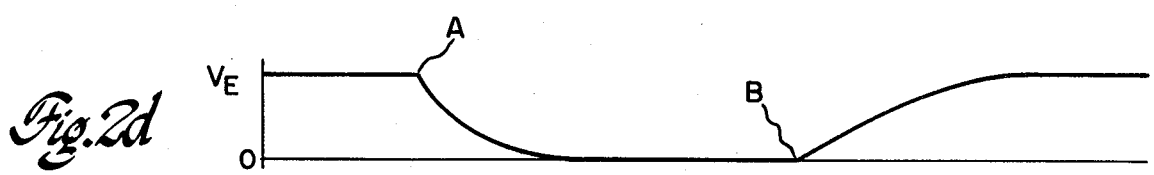
Figure 2E:
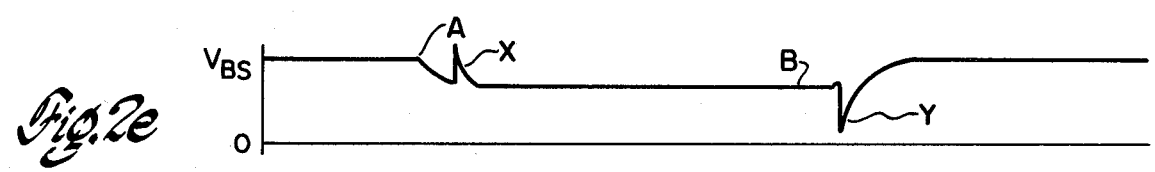
Figure 2F:
Figure 2G:
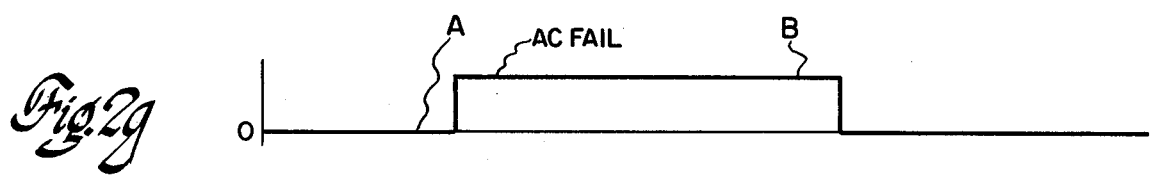
Figure 2H:
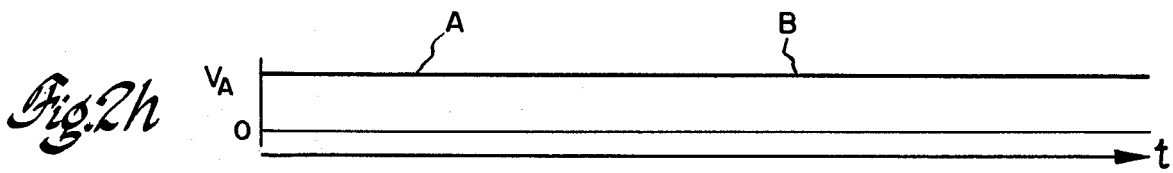

The detailed operation of the circuit of FIG. 1 may be best understood in conjunction with the voltage wave forms illustrated in FIGS. 2a-2h. FIG. 2a illustrates the filtered DC voltage produced by filter circuit 23 and which appears on bus $V_C$. A slight ripple appearing on the voltage waveform is due to the limited filtering provided by the filter circuit 23. In the preferred embodiment, the voltage on bus $V_C$ is approximately 14 V, which upon being regulated by voltage regulator 9 is stepped down to a ripple-free 6 V at buses $V_B$ and $V_A$ (shown in FIGS. 2c and 2h, respectively). Since bus $V_A$ is supplied by battery B1 during any AC power failure, the voltage thereon, as illustrated in FIG. 2h, remains at a constant level. In constrast, the voltage on bus $V_B$ shown in FIG. 2c varies, during an AC power failure, in response to the voltage on bus $V_C$. The battery voltage depicted in FIG. 2b is approximately equal to the regulated output on buses $V_B$ and $V_A$ and remains substantially constant at approximately 6 V.

The voltage waveforms associated with comparator transistor 18 are illustrated in FIGS. 2d-2f. Prior to AC power failure, designated A in FIGS. 2a-2h, the emitter voltage $V_E$ of transistor 18 (illustrated in FIG. 2d) is provided by bus $V_C$ and is approximately equal to two-thirds of the voltage thereon. The emitter voltage is sufficiently high compared to the voltage $V_{BS}$ on the base of the transistor 18, which is essentially equal to the voltage of battery B1, to bias it into conduction and cause a collector current to flow through resistor 19. The voltage $V_{CL}$ developed across resistor 19 (depicted in FIG. 2f) maintains the input to the Schmitt trigger-/inverter circuit above its switching voltage (high) so that the AC fail signal at its output is at 0 V (low), as illustrated in FIG. 2g. Since the emitter-base junction of transistor 18 is forward biased, a small transistor base current flow through resistor 15 and battery B1 to ground. Since battery B1 is a primary cell and does not required charging, the small current merely provides the battery with a trickle charge and prevents it from discharging during the standby period. If battery B1 is missing or has failed in an open circuit mode, the base current flows through resistor 14.

Upon the failure of AC power, the voltage on bus $V_C$, and then on bus $V_B$ will begin to decrease, forcing the transistor emitter voltage to decrease. When the emitter voltage becomes less than one diode drop (i.e., less than approximately 0.4-0.6 V) above the voltage at the base of the transistor (i.e., the battery B1 voltage), the transistor will begin to be biased into nonconduction. The collector current through resistor 19 will diminish, until the voltage on resistor 19 drops below the switching voltage of Schmitt trigger-inverter 22, causing its output to rise abruptly to a positive value and thereby providing an AC fail signal. As described herein, the AC fail signal at the gate of transistor 12 biases it into conduction so that the battery supplies power through diode 13 to bus $V_A$ and critical circuitry (not shown) connected thereto. As depicted in FIG. 2h, the voltage on bus $V_A$ remains constant even during AC power fail conditions.

The abrupt switch in the AC fail signal from 0 V to a positive value also ensures that transistor 18 is rapidly biased into nonconduction. The positive AC fail signal, additively combined with the voltage on previously charged capacitor 16, forces transistor 18 base voltage to be substantially more positive than the emitter voltage, biasing the transistor rapidly into nonconduction. The increased base voltage, illustrated in FIG. 2e by a voltage peak at point X, also produces a current through resistors 17 and 15 for a time equal to the time constant determined by the sum of the component values of resistors 17 and 15 multiplied by the value of capacitor 16. This current has the additional effect of ensuring that the AC fail signal remains high for at least the time constant period. The microprocessor or other electronic system is thus provided with an AC fail signal which will be present for at least a minimum predetermined period of time and which will not be subject to short-fail signal pulses which might otherwise exist because of AC power line disturbances due to lightning or other electrical noise generated by electrical apparatus such as electric motors.

When AC power is restored at the time designated by point B in FIGS. 2a–2h, the transistor emitter voltage increases proportionately with the voltage on the bus $V_C$. As the emitter voltage rises above the base voltage, the transistor is biased into conduction, causing collector current to increase, thereby raising the voltage across resistor 19. When voltage across resistor 19 exceeds the switching voltage of Schmitt trigger-inverter 22, the AC fail signal rapidly drops to 0 V. The FET transistor 12 is thereby biased into nonconduction, so that buses $V_B$ and $V_A$ are again supplied by voltage regulator 9. The abrupt decrease in the AC fail signal voltage and the charge on capacitor 16 produce a heavy flow of emitter-base current through resistor 17, rapidly driving transistor 18 into conduction. The duration of the current flow is proportional to the time constant determined by the component values of resistor 17 and capacitor 16. The associated voltage peak, designated Y, is illustrated in FIG. 2e. Therefore, not only is a timely indication of the AC power restoration provided, but the indication persists for at least one resistor 17-capacitor 16 time constant, providing ample time for it to be properly and accurately decoded.

From the foregoing, it may be appreciated that the present invention provides a multi-bus power supply including reliable AC fail-detect and standby switchover circuitry. The circuit provides indication of the failure or restoration of AC power in a timely and unambiguous manner and maintains the indicator signal for a predetermined period of time, providing immunity from transients and allowing the indicator signal to be properly identified. This allows the battery switchover to be free of transients.

While certain preferred features of the invention have been shown by way of illustration, many modifications and changes will occur to those skilled in the art. It is, therefore, to be understood that the appended claims are intended to cover all such modifications and changes as fall within the true spirit of the invention.

The invention claimed is:

1. A circuit for detecting an AC power failure, including means for providing a first DC voltage, comprising:
   a source of reference voltage;
   a voltage divider providing a second DC voltage proportional to said first DC voltage;
   a voltage comparator-switch circuit for comparing said second DC voltage with the reference voltage, said comparator producing an output signal when said second DC voltage exceeds the reference voltage by a predetermined amount;
   a Schmitt trigger-inverter circuit coupled to the output of said comparator and providing an AC fail signal indicating an AC power failure when said output signal falls below a second predetermined level; and
   circuit means coupled to the output of said Schmitt trigger-inverter circuit, to said comparator-switch circuit and to said source of reference voltage for rapidly biasing said comparator-switch means into nonconduction when said Schmitt trigger-inverter produces the AC fail signal, and for rapidly biasing said comparator-switch means into conduction when AC power is restored.

2. The circuit of claim 1 wherein said voltage divider comprises at least two series connected resistors coupled at one free end to said means for providing said first DC voltage and coupled at the common point to said voltage comparator-switch circuit.

3. The circuit of claim 1 wherein said voltage comparator-switch circuit comprises a transistor coupled at its emitter to said voltage divider, at its base to the reference voltage, and at its collector to the input of said Schmitt trigger-inverter circuit.

4. The circuit of claim 3 wherein said circuit means comprises a series-connected resistor and capacitor connected between the output of said Schmitt trigger-inverter circuit and the base of said transistor.

5. The circuit of claim 1 wherein said reference voltage comprises a standby battery.

6. A power supply circuit including a battery switchover circuit for providing emergency power from a standby battery when AC power fails, comprising:
   the AC fail-detect circuit as in any of claims 1, 2, 3, 4, or 5;
   a voltage regulator coupled to receive said first DC voltage and providing a regulated DC output; and
   a switch means coupled to the output of said voltage regulator, to said standby battery, and to the output of said Schmitt trigger-inverter circuit, said switch means being biased into conduction by said AC fail signal so that said power supply provides emergency from said standby battery.

7. The power supply of claim 6 wherein said switch comprises an FET transistor coupled at its source to said standby battery, at its drain to the output of said voltage regulator, and at its gate to the output of said Schmitt trigger-inverter circuit.

8. A circuit for detecting the failure of an AC power source comprising:
   a source of reference voltage;
   means coupled to said AC power source for producing a DC voltage;
   a voltage comparator-switch circuit for comparing said DC voltage with a reference voltage, said comparator producing an output signal when said DC voltage exceeds the reference voltage by a predetermined amount;
   a Schmitt trigger-inverter circuit coupled to the output of said comparator and providing an AC fail signal indicating an AC power failure when said output signal falls below a second predetermined level; and
   circuit means coupled to the output of said Schmitt trigger-inverter circuit, to said comparator-switch circuit and to said source of reference voltage for rapidly biasing said comparator-switch means into nonconduction when said Schmitt trigger-inverter produces the AC fail signal, and for rapidly biasing said comparator-switch means into conduction when AC power is restored.

* * * * *